(12) United States Patent
O'Connor (10) Patent No.: US 8,250,822 B2
(45) Date of Patent: Aug. 28, 2012

(54) WALL FRAMING SYSTEM, METHOD AND PRODUCT

(76) Inventor: Neil O'Connor, Milwaukie, OR (US)

( * ) Notice: Subject to any disclaimer, the term of this patent is extended or adjusted under 35 U.S.C. 154(b) by 882 days.

(21) Appl. No.: 11/707,629

(22) Filed: Feb. 15, 2007

(65) Prior Publication Data

US 2007/0193187 A1 Aug. 23, 2007

Related U.S. Application Data (60) Provisional application No. 60/774,335, filed on Feb. 17, 2006, provisional application No. 60/794,225, filed on Apr. 20, 2006.

(51) Int. Cl.
*E04F 13/04* (2006.01)
*E04B 9/00* (2006.01)
(52) U.S. Cl. .............. 52/358; 52/360; 52/489.1; 24/546
(58) Field of Classification Search .................. 52/481.1, 52/483.1, 489.1, 241, 357, 358, 360, 656.1, 52/712; 24/296, 546, 910
See application file for complete search history.

(56) References Cited

U.S. PATENT DOCUMENTS

| | | | | |
|---|---|---|---|---|
| 2,132,832 A * | 10/1938 | Prive | ........................ | 52/349 |
| 2,207,374 A * | 7/1940 | Fernberg | ........................ | 24/293 |
| 2,248,224 A * | 7/1941 | Fernberg | ........................ | 24/618 |
| 2,767,786 A | 9/1952 | James | | |
| 2,796,158 A * | 6/1957 | Miles et al. | ..................... | 52/241 |
| 2,921,464 A * | 1/1960 | Olsen | ............................. | 52/359 |
| 3,321,880 A | 5/1967 | Ferrell et al. | | |
| 3,332,188 A * | 7/1967 | Schaefer | ........................ | 52/349 |
| 3,702,047 A * | 11/1972 | Harcuba | ........................ | 52/241 |
| 3,858,364 A * | 1/1975 | Proulx | ........................ | 52/127.1 |
| 3,906,695 A * | 9/1975 | Pilgrim et al. | .............. | 52/489.2 |
| 3,920,208 A | 11/1975 | Dowdy et al. | | |
| 3,984,960 A * | 10/1976 | Raio et al. | .................... | 52/489.1 |
| 4,043,092 A * | 8/1977 | Paul et al. | ........................ | 52/712 |
| 4,121,391 A | 10/1978 | Schroeder | | |
| 4,123,887 A * | 11/1978 | Weinar | ........................ | 248/351 |
| 4,376,361 A * | 3/1983 | Michael | ........................ | 52/241 |
| 4,433,524 A | 2/1984 | Matson | | |
| 4,497,091 A * | 2/1985 | Elliott | ........................ | 24/67.9 |
| 4,570,400 A | 2/1986 | Slager et al. | | |
| 4,575,979 A * | 3/1986 | Mariani | ........................ | 52/241 |
| 4,578,922 A * | 4/1986 | Wendt | ........................ | 52/489.2 |
| 5,088,609 A * | 2/1992 | Fryc | ........................ | 211/117 |
| 5,097,567 A * | 3/1992 | Glaus et al. | ...................... | 24/27 |
| 5,216,858 A | 6/1993 | Gilmour | | |

(Continued)

OTHER PUBLICATIONS

International Search Report from International Application No. PCT/US07/04226.

*Primary Examiner* — Brian Glessner
*Assistant Examiner* — Adriana Figueroa
(74) *Attorney, Agent, or Firm* — Klarquist Sparkman, LLP (57) ABSTRACT

An improved system, method and product are disclosed for attaching non load-bearing metal wall studs to an overhead metal track in metal stud framing systems used for wall partitioning, in a manner that allows the overhead track to deflect under load without transferring the load to the studs and any attached wall partitions. The system features compression spring attachment products that frictionally engage overlapping flange portions of the track and studs so that any overhead load-induced movements of the track are not transferred from the track to the studs, or to any wall partitions attached to the studs.

7 Claims, 6 Drawing Sheets

U.S. PATENT DOCUMENTS

| | | | |
|---|---|---|---|
| 5,222,335 A | 6/1993 | Petrecca | |
| 5,325,651 A | 7/1994 | Meyer et al. | |
| 5,640,823 A | 6/1997 | Bergeron et al. | |
| 5,664,392 A | 9/1997 | Mucha | |
| 5,979,854 A * | 11/1999 | Lundgren et al. | 248/354.3 |
| D421,897 S * | 3/2000 | Washecheck et al. | D8/395 |
| D438,782 S * | 3/2001 | Kalat | D8/395 |
| 6,408,589 B1 | 6/2002 | Bousquet | |
| 6,457,218 B1 * | 10/2002 | Lawrence | 24/563 |
| 6,578,335 B2 * | 6/2003 | Poliquin | 52/481.2 |
| 6,594,865 B2 * | 7/2003 | O'Mahony | 24/3.11 |
| 6,612,087 B2 | 9/2003 | diGirolamo et al. | |
| 6,647,691 B2 | 11/2003 | Becker et al. | |
| 6,668,510 B2 | 12/2003 | McManus | |
| 6,814,742 B2 * | 11/2004 | Kimura et al. | 606/151 |
| 7,281,359 B2 * | 10/2007 | Marshall | 52/712 |
| 2003/0024082 A1 * | 2/2003 | Seymour | 24/546 |
| 2003/0208887 A1 * | 11/2003 | Lee | 24/67.9 |

* cited by examiner

WALL FRAMING SYSTEM, METHOD AND PRODUCT

CROSS-REFERENCE TO RELATED APPLICATIONS

This application claims the benefit of U.S. Provisional Patent Application No. 60/774,335, filed Feb. 17, 2006, and U.S. Provisional Patent Application No. 60/794,225, filed Apr. 20, 2006, both of which are hereby incorporated herein by reference.

FIELD

The present invention relates to wall framing, and more particularly, to an improved attachment product, method, and system for attaching non-load-bearing metal studs to overhead tracks of a wall framing system so that the overhead tracks may deflect under load without transferring such load to their attached wall studs and their connected wall partitions, thereby preventing damage to the partitions. The present invention also includes a hand tool for facilitating interconnection of the studs and tracks with the attachment product.

BACKGROUND

Figure 1:
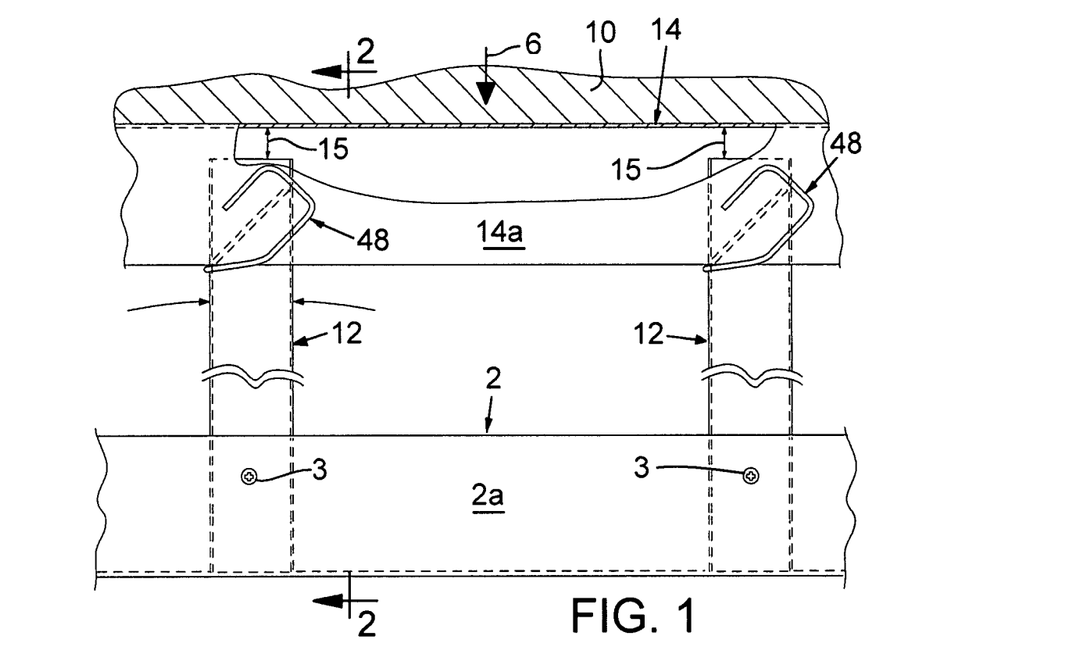
FIG. 1 is a side elevational view of a portion of a track and stud assembly for a drywall framing system in accordance with the invention, the studs being interconnected to an overhead track by wire deflection spring clips, also in accordance with the invention, and as shown in detail in FIGS. 5-9.
Figures 2, 3:
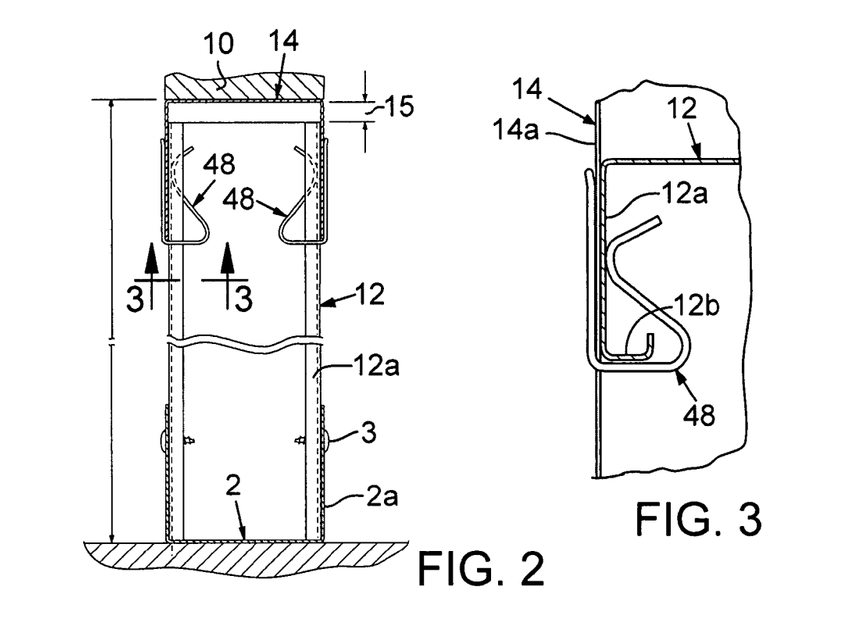
FIG. 2 is a vertical sectional view of the track and stud assembly of FIG. 1 taken along the line 2-2 of FIG. 1.
FIG. 3 is a sectional view taken along the line 3-3 of FIG. 2 showing one of the deflection spring clips of FIG. 2 interconnecting a portion of the track and stud shown in FIG. 2.

When metal studs are used to frame non-load-bearing walls, primarily in multi-story commercial construction, often there is a code of engineering requirement to allow for the deck above, as shown at 10 in FIG. 1, to be able to deflect under load. Currently this is typically accomplished in one of two ways. In both ways, the flanged metal studs 12, as shown in FIGS. 1 and 2, are deliberately cut short so that their upper ends do not abut the overlying load-bearing, deep-legged, flanged metal track 14 by at least the required deflection distance 15. In one way, the top track flanges, or deep legs, are vertically slotted to allow the screws that attach the stud flanges to the track flanges to slide up and down to facilitate the deflection of the track and its overlying attached deck when the deck is loaded. The other way is to temporarily attach the shortened studs to the flanges of the deep leg top track with sheet metal screws to hold the studs in place until just before the wall finish material, i.e., the wall partitions, are installed. The screws should be removed before such partitions are installed.

The problem with the first-described method of attachment, using a slotted top track, is that such slotted top tracks are expensive to manufacture. On the other hand, the problem with using sheet metal screws to attach the studs to the track until just before the wall finish material is installed is that the hanging crews will often forget to remove the temporary screws, resulting in a code violation. This also potentially results in cracking or other damage to the wall partitions or other finish materials attached to the studs when loading of the connected overhead tracks is ultimately transferred from the overhead decking and tracks to the studs and their connected partitions or other wall finish materials.

SUMMARY OF THE INVENTION

The foregoing problems with prior wall track and stud attaching systems, methods, and products are overcome by the present invention, which eliminates the need for slotted tracks and eliminates the problem of forgetting to remove temporary screws. The present invention also saves the cost of labor in having to go back to the job site to remove screws that attach the wall studs to the overhead tracks after the wall partitions are installed. The present invention also eliminates the high cost of manufacturing slotted, deep leg flanged metal tracks, which may cost anywhere from three to ten times that of a normal, unslotted deep leg metal track.

In accordance with the present invention, a system, method and attachment product are provided whereby conventional deep leg metal tracks are connected to conventional foreshortened flanged metal studs using novel spring clip connectors. These spring clips permanently interconnect flanged wall portions of the foreshortened studs with a downwardly extending flange portion, or leg, of the overlying track in a manner that allows the track to deflect relative to the connected studs under load and then return to its normal unloaded position when relieved of such load. The clips of the invention are also designed to avoid conflict with the flange and return portions of typical metal wall studs.

Two principal illustrative embodiments of the invention are disclosed. In one embodiment, a so-called "deflection spring clip" (also referred to hereinafter as a "deflection clip") has opposite end portions that pinch, or compress together, overlapping flange portions of an interconnected track and stud to interconnect the track and stud while allowing the track to deflect relative to the stud. The clip allows such deflection by allowing relative sliding movement of the overlapping flange portions of the track and connected stud while maintaining the interconnection of such flange portions.

According to a second principal embodiment, the spring clip features a coil spring that urges a clamp arm of the clip toward an opposed metal clamp plate. A lever arm of the clip is used to pivot the clamp arm of the clip away from such plate to allow overlapping flange portions of a track and stud to be inserted between the plate and clamp arm. When the coil spring urges the clamp arm against the overlapping flange portions of an interconnected track and stud, relative sliding movement to the flange portions is permitted to enable track deflection while the track and stud remain interconnected. This embodiment is referred to hereinafter as a "coil spring clip."

Both embodiments save time and money, with the deflection flat spring clip being the least expensive to produce.

With either embodiment, the clip will permanently interconnect the track and stud while allowing relative sliding movement between their overlapping flange portions when the track is under load.

Two illustrative embodiments of the deflection spring clip embodiment are disclosed herein. Both the deflection clips and the coil spring clips can be manufactured in various sizes to accommodate stud-and-track assemblies of various dimensions.

A primary object of the invention, therefore, is to provide a new and improved product, method and system for attaching conventional non-load-bearing flanged metal wall studs to conventional overhead tracks of a drywall framing system, without the need for modifying the studs or tracks to accommodate the attachment product, such that loads applied to the track will not be transferred to the studs and their connected wall partitions.

The primary object includes the goal of accomplishing the foregoing more efficiently, at a lower cost, and with more certainty than with prior such products, methods and systems.

DETAILED DESCRIPTION OF ILLUSTRATED EMBODIMENTS

Introduction

FIGS. 1-4 illustrate portions of a conventional drywall framing system employing the method, system and products of the present invention. The system includes spaced-apart vertical flanged metal wall studs 12 attached to a horizontal deep-flanged metal base track 2 by metal screw fasteners 3. Overlying studs 12 is an overhead, or top, track 14. Both the top track and base track are provided with deep legs, or flanges, 14a and 2a, respectively.

Studs 12, as shown best in FIG. 3, are also provided with deep flanges 12a terminating at their edges with returns 12b. The studs are foreshortened so that their upper ends do not abut and support the upper base wall of the top track, so as to provide gaps or spacing 15 therebetween. Such gaps allow the top track, attached to overlying flooring 10, which is supported by load-bearing columns (not shown), to deflect when an overhead loading of the flooring occurs, as indicated by the arrow 6 in FIG. 1. For example, when flooring 10 is subject to loading from above, any deflection of the flooring is transferred therefrom to top tracks, including track 14, causing deflection of such tracks. Spacing 15 between the top track 14 and wall studs 12 prevents such loading from being transferred from the top tracks to the wall studs, thereby protecting such studs from stresses and movement that would damage drywall and other wall partitions connected to the wall studs.

With the wall framing system as described, it is desirable to provide means for maintaining the wall studs 12 in their upright positions, both during construction of the framing system and thereafter, to prevent transferring any damaging stresses or movements from the studs to their connected wall partitions.

Figure 15:
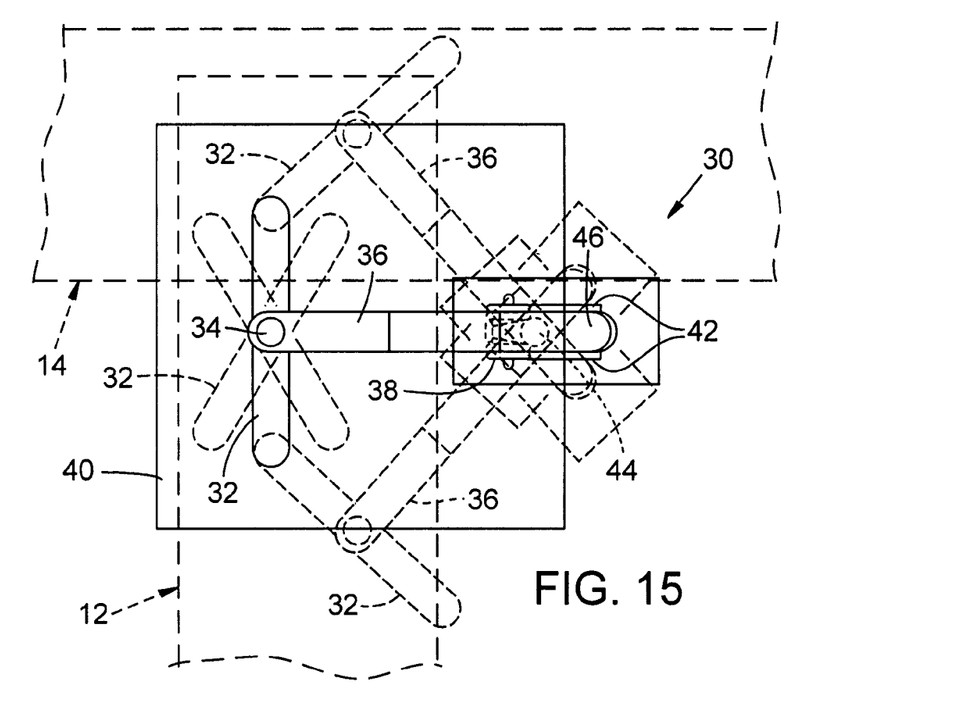
FIG. 15 is a top view of a coil spring embodiment of spring clip in accordance with the invention, with the clip being shown in various positions of adjustment in dashed lines.
Figure 16:
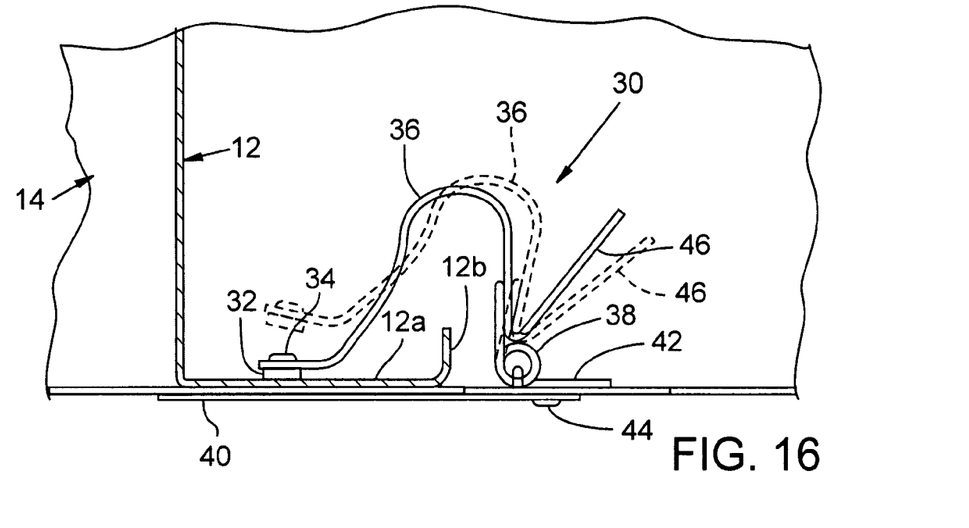
FIG. 16 is a side elevational view of the coil spring clip embodiment of FIG. 15 shown clamping a flange portion of a metal stud to the leg portion of an overhead track.

According to the present invention, spring clips, such as the flat deflection clips 18 of FIGS. 10-14, wire deflection clips 50 of FIGS. 1-9, and coil spring clips of FIGS. 15 and 16, are used to interconnect the overlapping flange portions of foreshortened wall studs 12 and top track 14. Such interconnections support and maintain the studs in their upright positions while allowing the connected top tracks to deflect under load relative to the studs without transferring any such load to the studs. Deflection of the top tracks is permitted because the spring clips interconnecting the foreshortened studs and top track flanges allow vertical sliding movement of the overlapping track flanges relative to their connected stud flanges while maintaining the studs in their upright positions.

Flat Deflection Clip Embodiment

Figures 10, 11, 12, 13, 14:
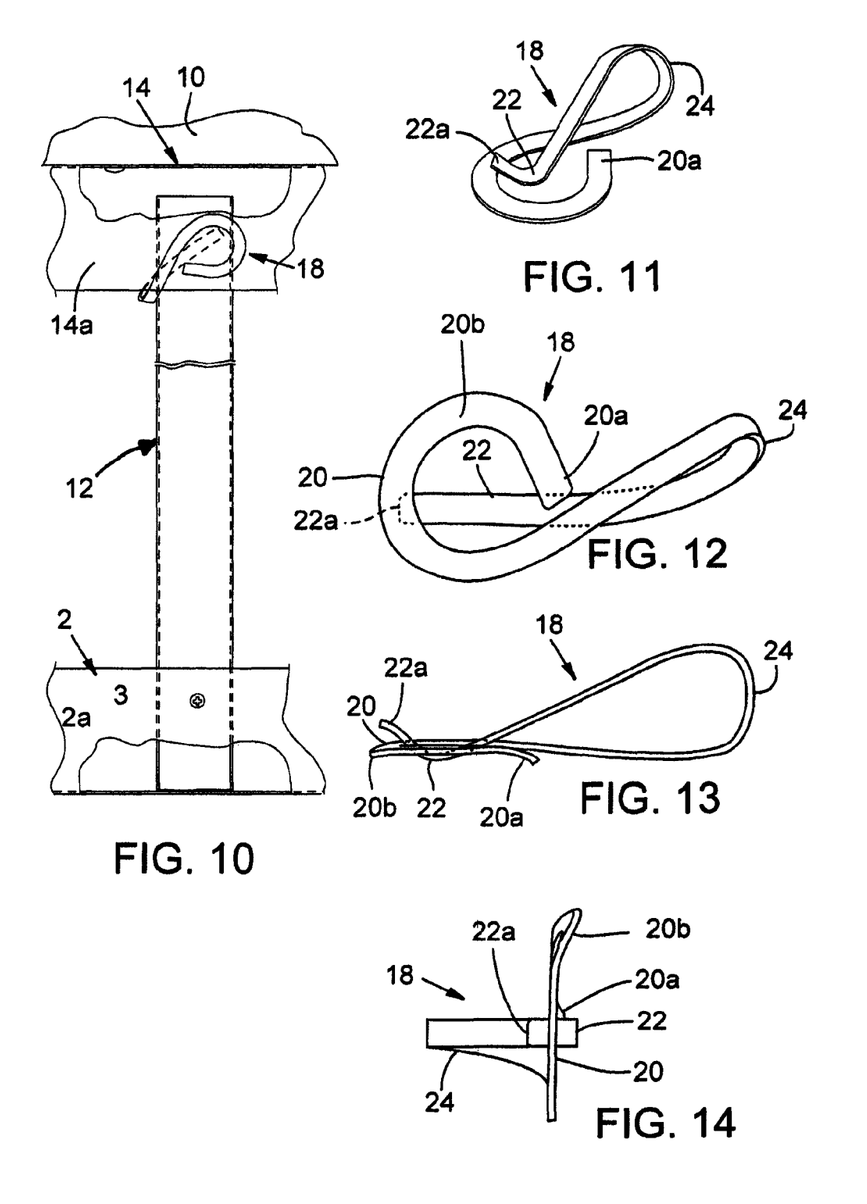
FIG. 10 is an elevational view of a portion of a track and stud assembly in accordance with the invention using a flat deflection spring clip embodiment of the invention as shown FIGS. 11-14 interconnecting the top track and a stud of the assembly in accordance with the invention.
FIG. 11 is a perspective view of the flat deflection spring clip shown in FIG. 10.
FIG. 12 is a bottom view of the deflection spring clip of FIG. 11.
FIG. 13 is a side elevational view of the deflection spring clip of FIG. 11.
FIG. 14 is an end view of the deflection spring clip of FIGS. 11-13 as viewed from the left end of the clip as shown in FIGS. 11 and 13.

According to one illustrative embodiment of the spring clip of the invention, best shown with reference to FIGS. 10-14, the spring clip comprises a one-piece flat deflection spring clip 18 made of a springy material such as, for example, a steel strip. This spring clip includes a first, generally curved clamping end portion 20 and an opposed, relatively straight clamping end portion 22 interconnected by a looped body portion 24. Clamping end portions 20 and 22 overlap one another and are spring biased toward one another in a clamping relationship by the looped body portion 24. The ends of the clamping end portions 20, 22, as shown at 20a, and 22a in FIG. 13, are upturned slightly away from one another to facilitate spreading the opposite ends away from one another when applying the clip to a wall stud flange, and then to an overlying flange of a top track 14 as shown in FIG. 10. The opposing end portions 20 and 22 lie generally in the same plane, while the looped body portion extends in a plane generally perpendicular to the plane of the clamping end portions so as to circumvent the flange and flange return of a connected wall stud, as shown in FIG. 10.

As will be best understood from FIG. 13, and also from FIGS. 2 and 3, the opposed clamping end portions 20 and 22 must be spread apart to insert therebetween the overlapping flange portions of a connected track and wall stud as shown, for example, in FIG. 10, and as also illustrated with respect to the wire embodiment of deflection spring clip 50, in FIGS. 1-4. As shown in FIGS. 10-14, body portion 24 is looped so that the spring clip will clear the return portion 12b of the flange 12a of stud 12 (see FIGS. 2-4) when the clamp end portions engage the overlapped portions of the track and stud.

Figure 4:
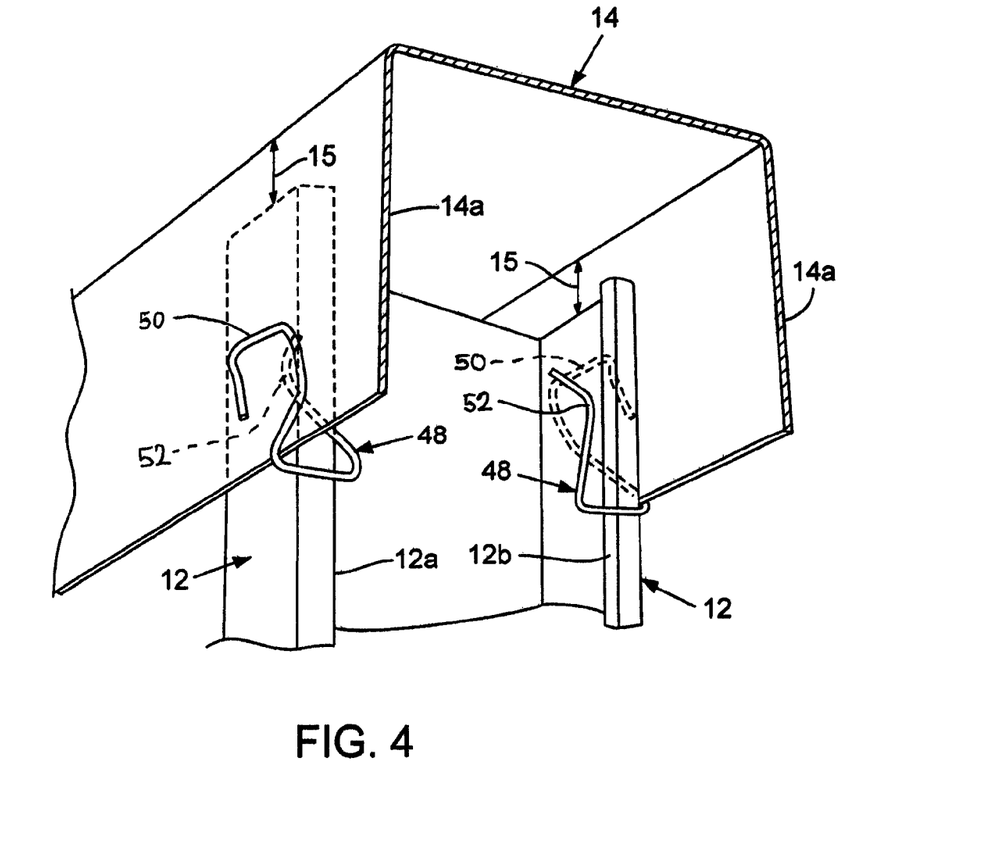
FIG. 4 is a perspective view of a portion of the track and stud assembly shown in FIGS. 1-3 as viewed looking toward the upper inside of the overhead track and one of the connected studs, and showing the stud connected to the track by a pair of the deflection spring clips as shown in FIG. 2.

Although the spring clip 18 is shown applied to one side flange 14a of the track 14 and one stud flange 12a as viewed in FIG. 10, the clip is shaped so that it may be applied to a stud flange and track flange on either side of the track, or to stud and track flanges on both sides of the track, as shown, for example, with respect to the other deflection clip embodiment in FIGS. 2 and 4.

Depending on the clamping force of the clip, it may be possible to apply the clip 18 by hand to overlapping flange portions of a track and stud where free ends of such flange portions overlap as shown, for example, in FIGS. 2 and 3. If the clamping force of the clip is not too great, this might be done by simply pulling apart the upturned clamp end portions 20b and 22a, as shown in FIG. 13, and then pushing the clip over the free end portions of the overlapping flange portions of the stud and track.

However, a more effective way is to first apply the clip to the stud flange below the lower edge of the track flange. Thereafter, the clip can be pushed up the stud flange and over the track flange to interconnect the stud and track.

The foregoing clip application process can be facilitated even further by using the application tool 26 shown in FIGS. 17, 17A, and 17B, as will be described further with reference to application of the wire deflection clip shown in FIGS. 2-9.

Coil Spring Clip Embodiment

FIGS. 15 and 16 illustrate another embodiment of a spring clip in accordance with the invention. This embodiment, referred to hereinafter as a "coil spring clip" shown generally at 30, includes a clamp arm 32 connected by a pivoting rivet 34 to one end of a looped body portion 36. Body portion 36 is connected at its opposite end to a coil spring 38.

Coil spring 38 urges the body portion and connected clamp arm 32 in a counterclockwise direction as viewed in FIG. 16 toward an opposing clamping plate 40. The coil spring is mounted on a mounting plate 42 which, in turn, is pivotally mounted to the clamp plate 40 by a pivoting rivet 44. Thus, the clamp arm 32 may be pivoted relative to body portion 36. Also, body portion 36 and its attached clamp arm 32 may be pivoted relative to the clamp plate 40 by pivoting mounting plate 42 on the base plate 40.

As will be noted in FIG. 16, body portion 36 of the coil spring clip has a looped configuration in a plane generally perpendicular to clamping plate 40 and clamp arm 32, enabling the coil spring clip, like the previously described deflection spring clip, to clear any flange and flange return of a wall stud.

The looped body portion 36 of the coil spring clamp 30 is also provided with a lift handle 46 connected to coil spring 38. By manually pushing down on handle 46, as shown in FIG. 16, body portion 36 and its connected clamp arm 32 may be rotated via coil spring 38 away from clamp plate 40 so that clamp arm 32 may be passed over stud return 12b of stud flange 12a as clamp plate 40 is applied to track flange 14a of track 14. Then, when the handle 46 is released, the coil spring 38 will move clamp arm 32 into clamping engagement with the adjacent stud flange 12a, as shown in FIG. 16.

Wire Deflection Clip Embodiment

FIGS. 5-9 illustrate another version, or embodiment, of the deflection spring clip shown in FIGS. 10-14. The deflection spring clip of FIGS. 5-9 functions to interconnect metal wall studs to an overlying track in a manner similar to the deflection spring clip of FIGS. 10-14. That is, the clip 48 of FIGS. 5-9 applies a clamping force to overlapping flange portions of a stud and track using opposed clamping end portions 50, 52 of a one-piece springy wire material at a pinch point of the overlapping stud and track. This is shown, for example, in FIGS. 10, 11, and 13 with respect to the version of FIGS. 10-14, and in FIGS. 1-4 with respect to the versions of FIGS. 5-9.

The principal difference between the deflection clip of FIGS. 10-14 and the clip of FIGS. 5-9 is the springy metal or other material from which they are formed. As previously noted, the deflection clip of FIGS. 10-14 is formed from a strip of flat metal or other springy material by curving the clamping end portions 20, 22 from the main body portion 24, providing the clip with a generally curvilinear shape.

In contrast, the deflection clip of FIGS. 5-9 is formed of a springy metal wire or other springy wire material of generally circular cross-section. In addition it will be noted that the wire deflection clips of FIGS. 5-9 are generally more angular in shape than the more curvilinear clips of FIGS. 11-14.

Figures 5, 7:
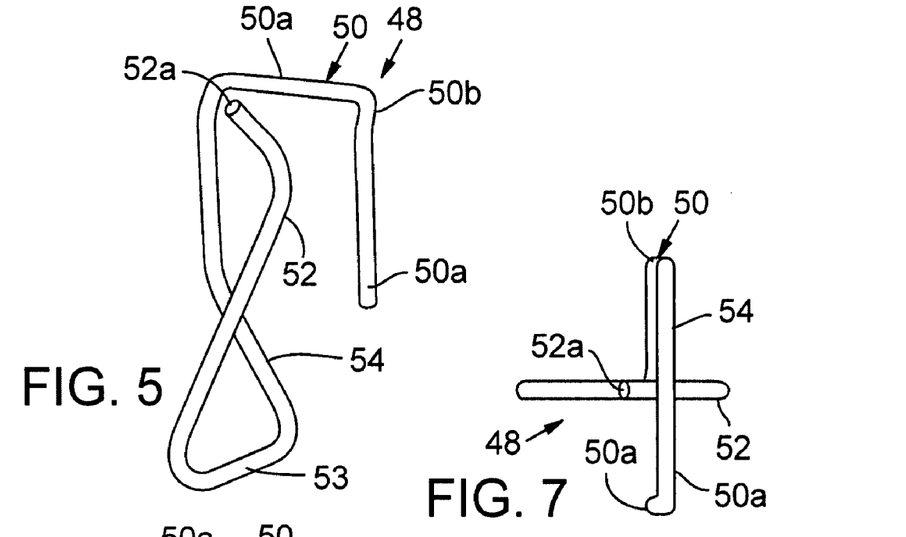
FIG. 5 is an enlarged side elevational view of a wire spring clip embodiment of deflection clip as shown in FIGS. 1-4.
FIG. 7 is a top view of the spring clip shown in FIGS. 5 and 6, as rotated approximately 45 degrees clockwise from its position shown in FIG. 6.
Figures 6, 8:
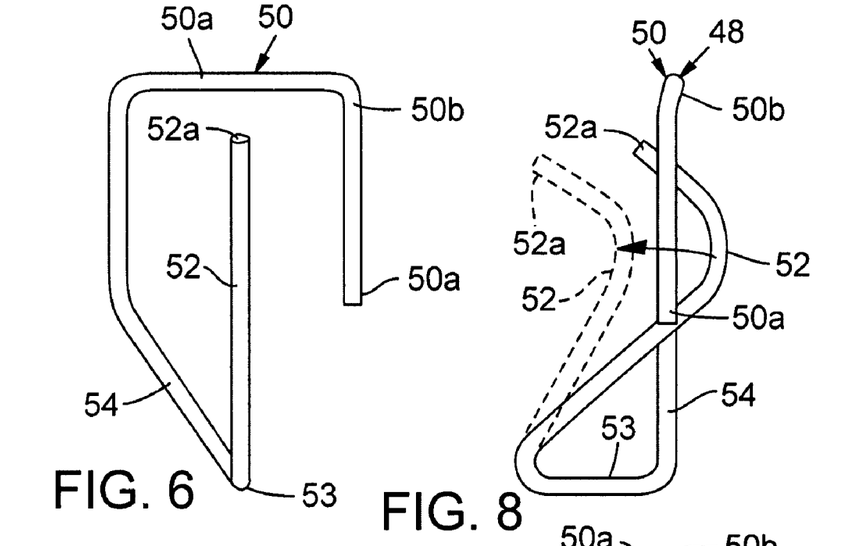
FIG. 6 is an elevational view of the spring clip shown in FIG. 5, but with the clip rotated counter-clockwise approximately 45 degrees from its FIG. 5 position.
FIG. 8 is an elevational view of the spring clip shown in FIGS. 5-7 but rotated approximately 45 degrees clockwise from its position shown in FIG. 6.

However, as shown best in FIGS. 8 and 3, both types of deflection clips are similar in that their respective opposed clamping end portions apply clamping pressure to overlapping track and stud portions inserted between such opposed clamping end portions. In fact, comparing the clip of FIGS. 5-9 with the clip of FIGS. 11-14, their overall configurations are quite similar.

With reference to FIGS. 5-9, the wire deflection clip 48 includes a generally looped clamping end portion 50 and an opposed, generally straight clamping end portion 52, interconnected by an angular and generally looped body portion 53.

As will be apparent from FIG. 8, each clamping end portion 50, 52 has oppositely upturned lip ends 50b, 52a for facilitating insertion of the clip in clamping relationship to overlapping flange portions of a track and wall stud as shown, for example, in FIGS. 1-4.

FIGS. 5-9 show the spring clip 48 at scale. The spring clip 48 comprises no more than two angles having an interior included angle of less than 90°. For example, the spring clip 48 can comprise only one angle (e.g., the angle shown at the bottom left of FIG. 8) having an interior included angle of less than 90°.

The wire deflection clip 48 has its looped clamping end portion 50 terminating at a free end 50a. Similarly, the single-arm clamping end portion 52 terminates at a free upturned lip end 52a adjacent to the looped upturned lip end 50b of clamping end portion 50.

The looped clamping end portion 50 is joined to the single-arm clamping end portion 52 by a connecting wire section 54 that lies generally in the same plane as clamping portion 50 and the looped body portion 53.

Figure 9:
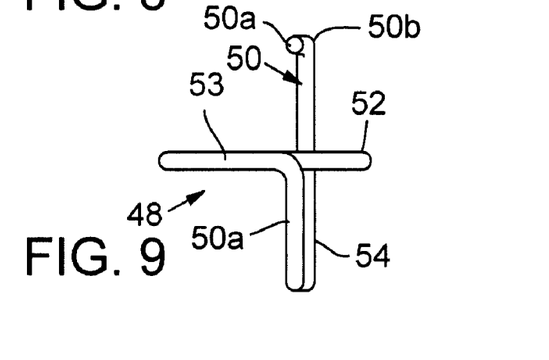
FIG. 9 is a bottom view of the spring clip shown in FIGS. 5-8 and as viewed looking upward toward the clip as positioned in FIG. 8.

The looped body portion 53, like the looped body portion 24 of the flat deflection clip 18, lies in a plane generally perpendicular to the plane of the looped clamping portion 50, as shown in FIGS. 8 and 9. The purpose of the looped body portion 53 is to circumvent the return portions of the flanged wall studs, as shown in FIGS. 2 and 3.

FIG. 1 shows the wire deflection clips of FIG. 5 interconnecting a series of wall studs to an overhead track in accordance with the invention.

Application Tool

Figures 17, 17A:
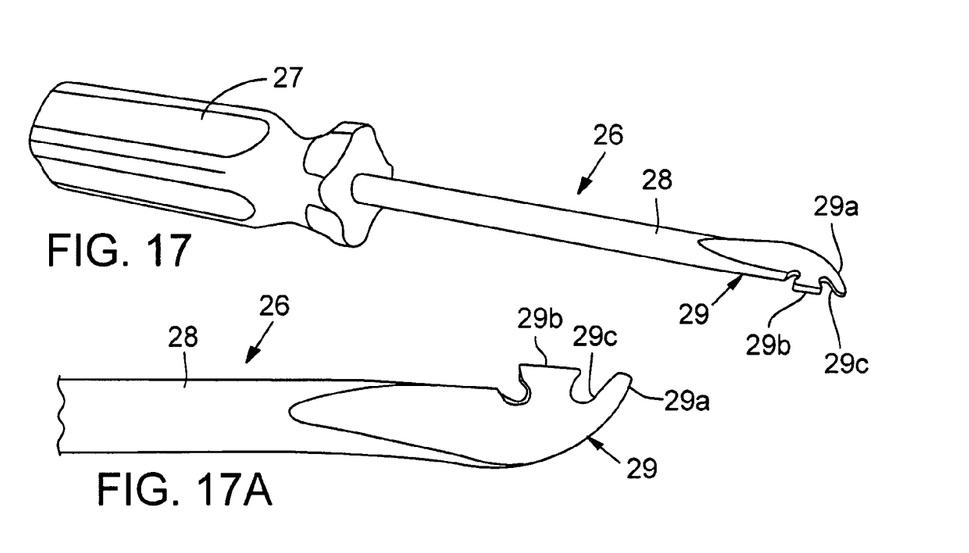
FIG. 17 is a perspective view of a hand tool for facilitating the installation of deflection spring clips of the invention on the wall studs and overhead track of a drywall framing system.
FIG. 17A is an enlarged side view of the working end portion of the hand tool of FIG. 17.

The application tool 26 of FIGS. 17 and 17A is a hand tool to facilitate installation of the wire deflection clip 48, or possibly with the need for a slightly different-shaped working end, the flat deflection clip 18.

Tool 26 includes a handle 27, attached shaft 28, and hook-type working end 29. Working end 29 includes a round-nosed hook end 29a separated from a rearward flat blade-like section 29b by a rounded recess 29c. Recess 29c is sized and shaped to receive an outermost lip portion 50b of clip portion 52 as shown in FIG. 8.

Figure 17B:
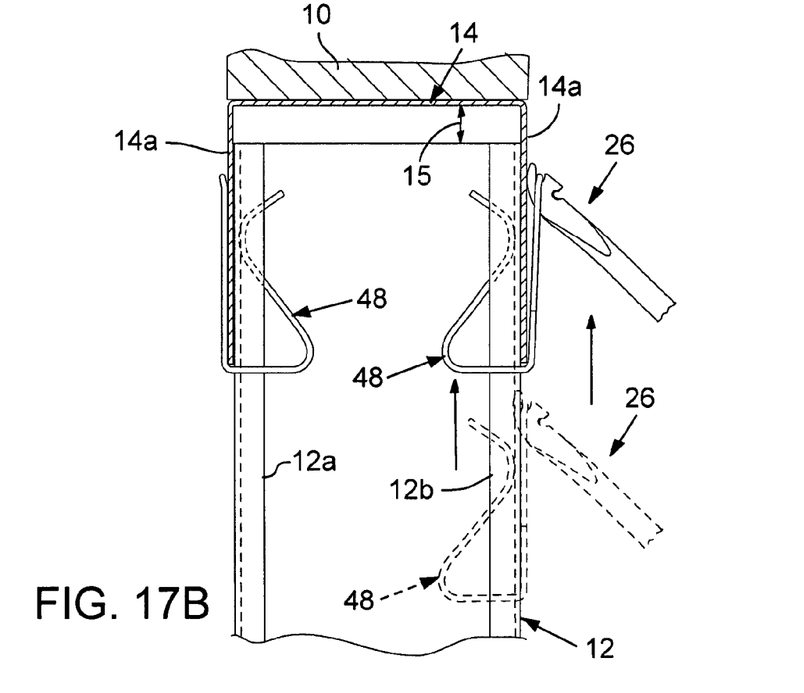
FIG. 17B is an elevational view of a wall stud and overhead track illustrating the process of applying a deflection clip of the type shown in FIGS. 1-9 to the stud and track using the hand tool shown in FIGS. 7 and 17A.

Referring to FIG. 17B, the clip 48 is first applied to the flange portion 12a of stud 12 below the lower edge of track flange 14a by snapping the clip around the flange by hand as shown in the lower portions of FIG. 17B. Then, using the working end 29 of tool 26, the rounded point 29a is slipped under lip 50b of clip 48, into recess 29c. With the clip end portion 50a caught in tool recess 29c, the tool is used to pull such end portion up and out over the lower edge of track flange 14a, thereby joining the track and stud in a friction fit under the spring tension applied by the opposing compression portions 50a and 52 of the clip. With the clip installed, the tool is released from the clip by rotating the tool upward as shown in the upper view of the clip in FIG. 17B.

Conclusion

Both the deflection spring clips and the coil spring clip are relatively easy to apply to interconnect stud flanges to the flanges of an overhead track. Both types of clips may be permanently attached to their connected studs and tracks since they allow for deflection of the track relative to its connected studs. Both types of clips provide for an attachment method and system that should be substantially less expensive than prior attachment methods and systems.

Both types of spring clips of the invention are safe to apply. With the deflection spring clips, all edges and ends may be rounded, providing a very safe attachment process.

The following features are unique to the deflection spring clips and improve their performance: The return loop of the clip body to the backside of the stud, whether of the wire or strip version, maximizes the spring force while avoiding the return leg of the stud flange (see FIGS. 2-4, 10, and 17B). Also, the bent edges 20a, 20b on the rounded face plate portion of clamp portion 20 simplify installation of the clip onto a stud and track (see FIG. 4). Having the two bent edges 20a, 20b (see FIGS. 13 and 14) on the rounded face plate portion of clamp portion 20 allows clip 18 to be installed on studs facing in either direction, with a single clip embodiment, thereby avoiding the need for both right-handed and left-handed embodiments and simplifying installation even further (see FIGS. 3 and 4). The curved lips 52a, 50b at the clamping portions of the clips of FIGS. 5-9 provide similar advantages.

The tool 26 has also been created to facilitate installation of the deflection spring clips, even further simplifying installation of the clips.

In view of the many possible embodiments to which the principles of my invention may be applied, it is to be understood that the illustrated embodiments are only currently preferred examples thereof. Such embodiments should not be taken as limiting the scope of the invention. I claim as my invention all attachment products, methods, systems, and tools therefor, coming within the true spirit and scope of the following claims.

I claim:

1. An asymmetrical spring clip for use in interconnecting a generally vertically extendible flanged wall stud and a generally horizontally extendible flanged member, the wall stud having a flange and an angled flange return, the flanged member having a flange terminating at a distal edge, the spring clip comprising:

first and second opposed clamping end portions, the clamping end portions being asymmetrical relative to one another and configurable to apply a clamping force to overlapping flanges of the wall stud and the flanged member, wherein the first clamping end portion has a generally flat shape and is positionable generally flush against an outer surface of the flange of the flanged member, and wherein the second clamping end portion is positionable to contact an inner surface of the flange of the wall stud; and an asymmetrical clip body portion interconnecting said opposed clamping end portions and biasing said opposed clamping end portions toward one another for applying the clamping force, the clamping force being sufficient to clip the wall stud and flanged member together while allowing relative vertical sliding movement between the flanges so that the flanged member can move vertically relative to an erect wall stud in response to changes in a supported load, the body portion configured to extend from the first clamping end portion, around the distal edge, around the flange return, toward the inner surface of the flange of the wall stud, and to the second clamping end portion;

wherein the spring clip comprises no more than two bends having an interior included angle of less than 90°;

wherein said clamping end portions and said body portion are comprised of a springy material; and wherein said opposed clamping end portions each includes an upturned lip end portion, with the lip end portions of the opposed clamping portions being upturned in directions opposite one another.

2. A spring clip according to claim 1 wherein said springy material comprises a flat strip of springy material.

3. A spring clip according to claim 2 wherein said springy material is a metal material.

4. A spring clip according to claim 1 wherein said springy material comprises a springy metal material operable to provide a dynamic friction fit between the wall stud and the flanged member.

5. A spring clip according to claim 1 wherein said springy material comprises a springy wire material.

6. A spring clip according to claim 1 wherein said springy wire material is a metal material.

7. The spring clip of claim 1, wherein the spring clip comprises only one bend having an interior included angle of less than 90°.

* * * * *